United States Patent
Arisaka et al.

(10) Patent No.: US 9,947,361 B2
(45) Date of Patent: Apr. 17, 2018

(54) ACTIVE VIBRATION CONTROL DEVICE AND DESIGN METHOD THEREFOR

(71) Applicant: Hitachi, Ltd., Chiyoda-ku, Tokyo (JP)

(72) Inventors: Toshihiro Arisaka, Tokyo (JP); Takashi Saegusa, Tokyo (JP); Itsuro Kajiwara, Sapporo (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 15/059,425

(22) Filed: Mar. 3, 2016

(65) Prior Publication Data

US 2016/0275984 A1    Sep. 22, 2016

(30) Foreign Application Priority Data

Mar. 18, 2015  (JP) ................. 2015-054153

(51) Int. Cl.
  *G01M 7/02*   (2006.01)
  *G11B 19/20*  (2006.01)

(52) U.S. Cl.
  CPC ......... *G11B 19/2018* (2013.01); *G01M 7/022* (2013.01)

(58) Field of Classification Search
  CPC ............................ G11B 19/2018; G01L 1/16
  USPC .......................................................... 73/658
  See application file for complete search history.

(56) References Cited

U.S. PATENT DOCUMENTS

| | | | |
|---|---|---|---|
| 6,116,389 A  * | 9/2000 | Allaei | E04H 9/02 123/192.1 |
| 6,735,838 B1 | 5/2004 | Triller et al. | |
| 7,370,524 B2 * | 5/2008 | Hopkins | G05B 11/42 73/146.2 |
| 2005/0200243 A1 | 9/2005 | Spangler et al. | |
| 2006/0106500 A1* | 5/2006 | Allaei | G05D 19/02 700/280 |
| 2008/0033703 A1* | 2/2008 | Enomoto | G06F 17/5018 703/7 |

FOREIGN PATENT DOCUMENTS

| | | | |
|---|---|---|---|
| CN | 201010022779 | * | 1/2010 |
| CN | 103413185 | * | 11/2013 |
| EP | 0797184 A2 | * | 9/1997 |
| JP | 2000-198500 A | | 7/2000 |

(Continued)

OTHER PUBLICATIONS

Japanese-language Office Action issued in counterpart Japanese Application No. 2015-054153 dated Nov. 28, 2017 with unverified English translation (Seven (7) pages).

*Primary Examiner* — J M Saint Surin
(74) *Attorney, Agent, or Firm* — Crowell & Moring LLP (57) ABSTRACT

Provided is a vibration control device mounted on a structure body of a target where vibration should be damped, including: a vibration detection unit that detects vibration of a portion of the target; a vibration generation unit that generates strain in a portion of the target; and a control unit that generates a control signal to determine drive force of the vibration generation unit based on a signal from the vibration detection unit. In the vibration control device, strain energy distribution of the target is measured or calculated, and setting positions of the vibration detection unit and the vibration generation unit are determined based on an optimization method within a range in which strain energy changes rapidly.

5 Claims, 7 Drawing Sheets

(56) References Cited

FOREIGN PATENT DOCUMENTS

| | | | |
|---|---|---|---|
| JP | 2002-535582 | A | 10/2002 |
| JP | 2004-144579 | A | 5/2004 |
| JP | 2005-106261 | A | 4/2005 |
| JP | 2006-114819 | A | 4/2006 |
| JP | 2007-253755 | A | 10/2007 |
| JP | 2012-185658 | A | 9/2012 |
| JP | 2014-47830 | A | 3/2014 |
| WO | WO 2014/192088 | A1 | 12/2014 |

* cited by examiner

ACTIVE VIBRATION CONTROL DEVICE AND DESIGN METHOD THEREFOR

CLAIM OF PRIORITY

The present application claims priority from Japanese Patent application serial No. 2015-054153, filed on Mar. 18, 2015, the content of which is hereby incorporated by reference into this application.

BACKGROUND OF THE INVENTION

1. Field of the Invention

The present invention relates to an active vibration control device and a design method therefor.

2. Description of the Related Art

As a related art of this technology, JP-2006-114819-A is known. In this JP-2006-114819-A, disclosed is a technology in which damping efficiency for respective vibration modes generated on a plate, more specifically, for both a primary mode and a third mode is improved by grasping "displacement (distortion) distribution in the respective vibration modes and optimizing a piezoelectric inclination characteristic structure and a setting position".

SUMMARY OF THE INVENTION

The present invention is directed to suppressing vibration of a device in which influence from the vibration should be eliminated.

For example, by exemplifying an information storage device mounted with a plurality of recording devices, faults that are caused by vibration and may lead to performance deterioration of the information storage device will be described. Here, a storage device in which a hard disk drive (HDD) is mounted as a generally-used recording device will be described. HDD generates vibration by itself by operating actuator inside thereof and a spindle of the disk. This vibration is transmitted, via a housing of the storage device, to the HDD that is mounted on the storage device and does not separately perform input/output, and then the HDD not separately performing input/output is also vibrated. The vibration from the HDD not performing input/output multiply overlaps and is transmitted as external vibration to an HDD that performs input/output, thereby giving influence to operation of the HDD that performs input/output, and exerting an adverse effect on input/output amounts. Further, in order to cool a device, a fan that forcibly circulates air to radiate heat is generally mounted. In this case, vibration generated by the fan may be transmitted as the external vibration via the housing of the storage device to the HDD that performs input/out.

Moreover, since performance deterioration is caused by vibration in a measuring device, such as an electronic microscope required to capture an image of an extremely fine area with high accuracy, and a manufacturing device used to perform superfine processing, it is an important object to suppress vibration in the device in which vibration should be eliminated. Furthermore, vibration of a structure body may be a source of noise, and may reduce added value to the device.

There are some methods as the method to damp vibration, and as disclosed in JP-2006-114819-A, for example, there is a method of applying an active vibration control device so as to damp vibration by detecting vibration of a target, generating a control signal so as to suppress the vibration, and driving a vibration generation unit. In the following, such a device will be referred to as an active vibration control device. This kind of active vibration control device is widely known in the related arts, and is famous for having vibration control performance higher than a passive vibration control device. On the other hand, since design of the active vibration control device is difficult, special-tailored design is required for an application target, and the cost becomes high as a vibration control device. Further, providing such special-tailored design to every application target requires long development time to apply the vibration control device, and this also hinders application of the active vibration control device along with difficulty in designing a control system.

According to the disclosure in JP-2006-114819-A above, a piezoelectric element is used as an actuator for active vibration control. Disclosed is the technology in which vibration is damped by improving a damping rate of a vibration mode by acquiring strain distribution in the vibration mode of a target, and forming a piezoelectric body having piezoelectric characteristic distribution that conforms to the strain distribution. In the case of damping vibration by thus using the piezoelectric element as the actuator, it is necessary to generate deformation at a corresponding portion of the target so as to cancel deformation generated in the vibration mode. Therefore, an effect of active vibration control is improved by changing the characteristic of the piezoelectric element in accordance with the strain distribution. However, according to this method, the piezoelectric element itself is needed to be suitably developed for each target, and in the case of considering a molding process and the like therefor, there may be a problem in which a long development time is required before application. This is demerit in the viewpoint of reducing cost of the active vibration control device and shortening the development time, and may also hider application of the active vibration control device Additionally, although it is described that the strain distribution of the target is acquired and the piezoelectric actuator is set based on this strain distribution, a portion having large strain has a range of certain area, and nothing is described about a concrete setting position and setting direction within this range. Further, such matters are generally not obvious.

On the other hand, PCT/JP2013/064832 (WO 2014/192088 A1) discloses an active vibration control device having a configuration in which "the vibration control device is mounted on a target structure body where vibration should be damped, and provided are: multiple identical vibration detection units that detect strain at a portion of the target; multiple identical vibration generation units that generate strain at different portions of the target; and a control unit that generates, based on signals from the vibration detection units, a control signal to determine drive force of the vibration generation unit. With this structure, the vibration detection units to detect vibration and the vibration generation units that generate the drive force to damp vibration of a target, namely, actuators can be disposed at optional positions of a target object, and can be arranged at positions where vibration can be more efficiently suppressed. In designing the active vibration control device, provided that predetermined vibration detection unit (sensor) and vibration generation unit (actuator) are used and that it is possible to specify, with minimum labor, setting positions where these units can be efficiently operated, man-hour (cost and time) required for designing a vibration control device can be largely cut down.

Further, according to the technology disclosed in JP-2006-114819-A where vibration characteristics are improved by mounting the piezoelectric element actuator on a magnetic head actuator of an HDD, design is completed by creating a finite element model of the target (head actuator) and then calculating both arrangement of the piezoelectric element actuator and optimized design of a control system therefor at the same time. By thus designing, it is shown that an effect of reducing gain in a vibration mode of the target by using the piezoelectric element actuator preliminarily prepared can be obtained. According to this method, simulation of a calculation machine is needed to be performed while the effect of setting position of the actuator and the like can be quantitatively evaluated, thereby requiring man-hour and time for the processes from model creation to calculation. Moreover, in the case where the target has a complex structure or is large-sized, the man-hour is further increased.

Considering the above situations, the present invention is directed to providing a method of efficiently and quickly designing a vibration control device that is added to a device where influence from vibration should be damped and that provides high vibration control performance at low cost.

To solve the above-described problems, configurations recited in the scope of claims are adopted, for example.

The present application includes a plurality of units to solve the above-described problem. An example is to provide a vibration control device mounted on a structure body of a target where vibration should be damped, and the vibration control device includes: a vibration detection unit configured to detect vibration of a portion of the target; a vibration generation unit configured to generate strain in a portion of the target; and a control unit configured to generate a control signal to determine drive force of the vibration generation unit based on a signal from the vibration detection unit. In the vibration control device, strain energy distribution of the target is measured or calculated, and setting positions of the vibration detection unit and the vibration generation unit are determined based on an optimization method within a range in which strain energy changes rapidly. Also, another example is to provide a design method for the above-described vibration control device, which determines the setting positions of the vibration detection unit and the vibration generation unit based on the optimization method within the range in which strain energy changes rapidly.

In the related art, a long design time and a designer with expert knowledge are required for the active vibration control device special-tailored designed for each device because design is made by examining a configuration and a control method suitable for each target. Due to this, the cost for the vibration control device is increased. Additionally, there may be a case where vibration characteristics of an actual target device are different from those at the time designing. On the other hand, according to the present invention, the plurality of vibration detection units has substantially same specifications in a shape and a property, thereby achieving to measure a vibration state of a target in a better way. At the same time, the vibration generation units also have the same specification in a shape and property. Therefore, drive force that can efficiently damp vibration in the target can be generated by preliminarily determining the number and arrangement of the vibration generation units in accordance with the characteristics of the target. Calculation to acquire arrangement of the vibration generation unit is performed based on the optimization method within a limited range where the strain energy rapidly changes. Therefore, even in the case of having a complex structure or having a large-sized structure, calculation time can be significantly shortened because of the small calculation range. Further, since right and wrong of arrangement of the vibration generation units can be evaluated quantitatively by the optimization calculation, entire performance of the target product can be well balanced by considering trade-off with other design conditions even when arrangement is not the best condition at the time of designing.

Further, not only the vibration generation unit, but also arrangement of the vibration detection unit can be determined by performing paradoxical simulation based on the above-described optimization method. In the case of using a sensor that detects an acceleration rate as the vibration detection unit (sensor), simulation can be performed by calculating the acceleration rate based on a deformation amount at the setting position. Further, in the case of using a sensor that detects strain as the vibration detection unit, the setting position of the vibration detection unit can be determined by performing simulation based on the optimization method in the same manner while specifying a range where strain of a vibration mode to be damped is large. In this case also, calculation time can be shortened in a more preferable manner because of having the small examination range.

Further, for the optimization method to determine arrangement, a generally-applied method may be considered. For example, search for arrangement may be performed by using a genetic algorithm (GA), and since this method is widely used, calculation convergence can be improved, for example. Further, in the case where search for arrangement is performed by using a particle swarm optimization (PSO) method as the optimization method, calculation time is more shortened than the GA method and arrangement of the vibration generation unit can be determined in a shorter time. Other optimization methods may also be applicable, but in all cases, setting the range based on the strain energy distribution is effective because the smaller a search range is, the less calculation amount is and the shorter the required time is. A detailed description of the GA is provided in the literature "Special topic: Genetic Algorithm" in "Journal of the Society of Instrument and Control Engineers" Vol. 32, No. 1, January 1993, and a detailed description of the PSO method is provided in the literature "Particle Swarm Optimizers and Nonlinear Systems" in IEICE Fundamentals Review Vol. 5, No. 2, August 2011, for example.

With the above-described configuration, the active vibration control device can be introduced by simple design at low cost despite the fact that designing the active vibration control device has been difficult and a high barrier has existed in applying the same in the related. Further, a device that has a vibration problem can be quickly handled, and an added value to a target device can be more improved with performance guarantee.

Details of other problems, configurations and advantageous effects in addition to those described above will be apparent from the following description of embodiments.

DESCRIPTION OF THE PREFERRED EMBODIMENTS

In the following, embodiments will be described by using, for example, an RAID device when an information storage device is set as a target where vibration should be damped.

First Embodiment

Figure 1:
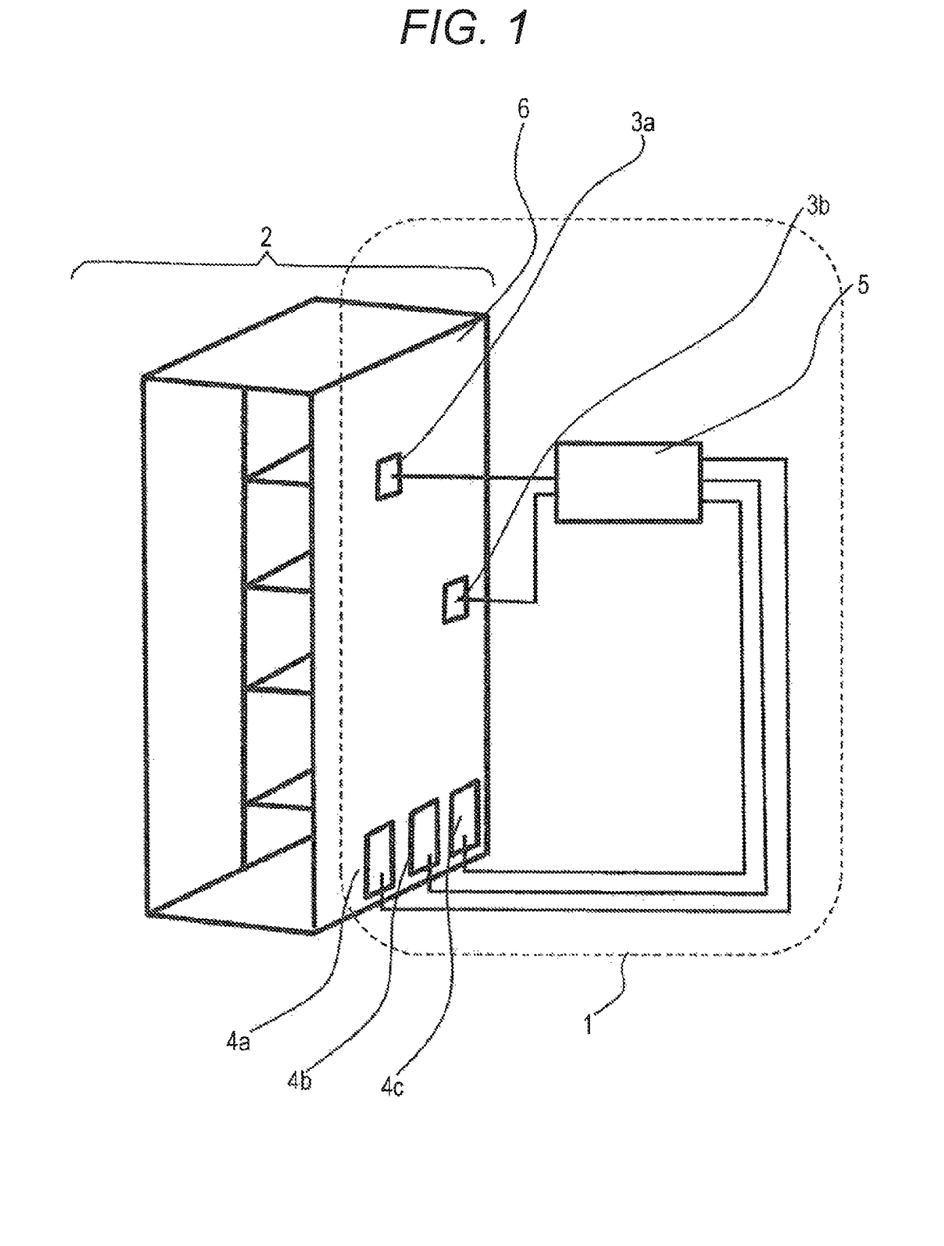
FIG. 1 is a configuration diagram illustrating a first embodiment.
Figure 2:
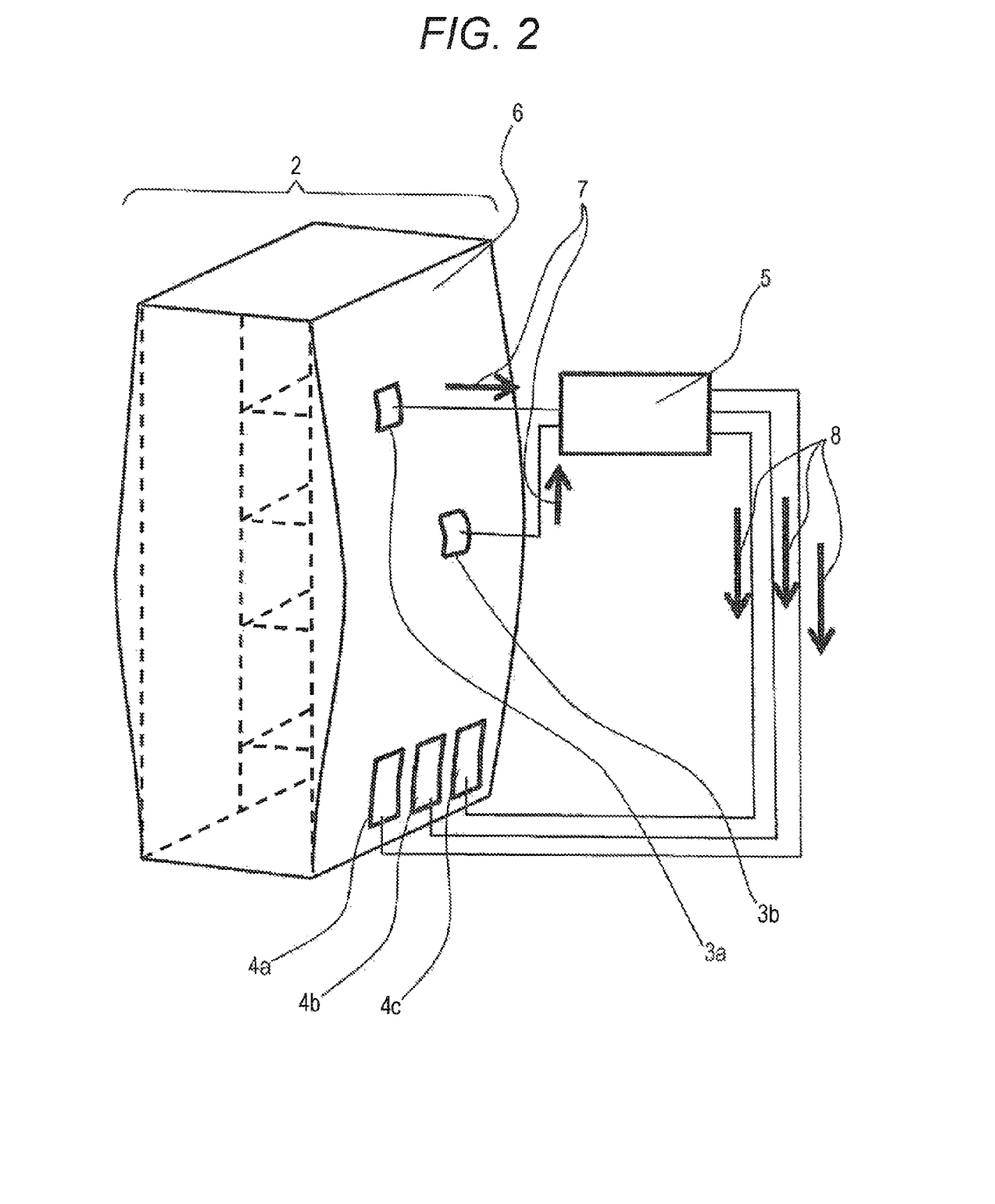
FIG. 2 is a schematic diagram illustrating operation of the first embodiment.
Figure 3:
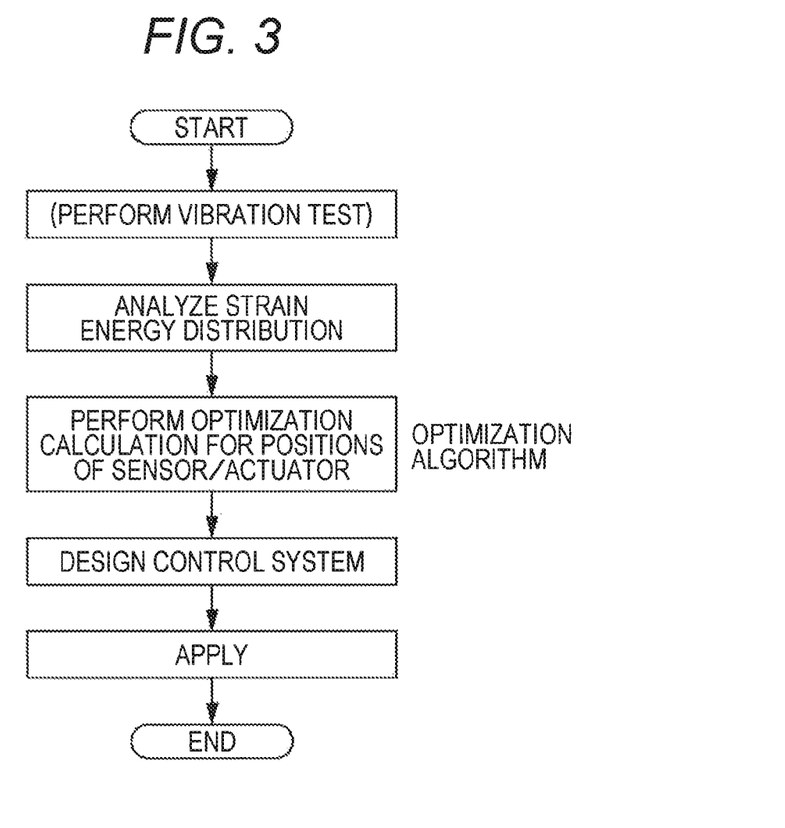
FIG. 3 is a flowchart illustrating a design procedure according to the first embodiment.

FIG. 1 is a configuration diagram illustrating a first embodiment. FIG. 1 is an example in which an active vibration control device 1 according to the present invention is mounted on a storage device 2 that is a target. Piezoelectric sensors 3a, 3b are attached to a structural plate 6 on a side surface of a housing of the storage device 2. Further, plate-like piezoelectric actuators 4a, 4b, 4c are attached to other portions of the structural plate 6, and the piezoelectric sensors 3a, 3b and the piezoelectric actuators 4a, 4b, 4c are connected to a controller 5 by wire. A mechanism of damping vibration at the structural plate 6 of the storage device 2 will be described by using FIG. 2. FIG. 2 is a diagram simply illustrating a case where the structural plate 6 generates bending vibration. Dotted lines in the drawing indicate an original shape of the storage device 2. When the storage device 2 vibrates, deformation indicated by solid lines is generated, and when the structural plate 6 is bent, the piezoelectric sensors 3a, 3b are deformed due to deformation of the structural plate 6, and voltage output 7 corresponding to a strain amount is output. The output is received in the controller 5. In the controller 5, a feedback circuit illustrated in FIG. 3 is formed such that the voltage output 7 becomes zero in a vibration frequency to be a target, thereby transmitting control output 8 to the piezoelectric actuators 4a, 4b, 4c. In accordance with the control output 8, the piezoelectric actuators 4a to 4c generate strain and deform the structural plate 6 so as to suppress vibration. Thus, vibration generated at the structural plate 6 is damped.

In this example, two sensors such as the piezoelectric sensors 3a, 3b are used, but in the case where the number of targeted vibration is many, that is, in the case where the number of vibration modes to be handled in the storage device 2 is many, it is preferable because multiple vibration can be detected by increasing the number of piezoelectric sensors 3. The reason is that since a portion that largely vibrates is different in each of the vibration modes, there is a vibration mode that can be hardly detected depending on the sensor position even when an attempt is made to detect the vibration mode only with one sensor like the related art. Further, in the case where the housing is substantially box-shaped like the storage device 2 of the present example, the vibration mode shows a complicated state (note that FIG. 2 is simply illustrated for description). Therefore, preferably, the piezoelectric sensors 3 are attached to other components as well not limited to one component that is the structural plate 6.

In the same manner, as for the piezoelectric actuator 4 having a function to deform the structural plate 6 so as to damp vibration, preferably, a plate-like piezoelectric element having a larger area is used in order to obtain large drive force capable of deforming the structural plate 6 against the vibration mode to be the target. However, there is a problem in which securing a place to attach the plate-like piezoelectric element having a large area may be difficult. Further, the piezoelectric element having the large area requires high cost due to difficulty in manufacture. Considering such problems, according to the device of the present invention, the plurality of the plate-like piezoelectric actuators 4 having the same shape and performance is adopted based on the same specifications. With this configuration, entire drive force can be secured and further the drive force capable of efficiently damping vibration of the target can be generated by preliminarily determining the number and arrangement of vibration generation units in accordance with characteristics of the target.

In this case, the piezoelectric sensor is used as the vibration detection unit, but other vibration detection units, such as a sensor to detect acceleration rate or a sensor to detect displacement and a speed, can be used.

FIG. 3 is a flowchart illustrating a design procedure for the active vibration control device 1 according to the present invention. In order to grasp vibration characteristics of the storage device 2 to be the control target, a natural vibration frequency and a natural mode of the target that includes a natural mode having vibration to be damped are measured by performing a vibration test. Next, the target storage device 2 is modeled by a fine element method (FEM), and a state space system formed of a matrix of the natural mode having a dimension lowered by using mode analysis is described. Here, in the case where a fine element analytical model can be trusted in correctly indicating vibration characteristics of the real storage device 2, there is no need to grasp the characteristics of the real storage device by first performing the vibration test. For example, that is the case where the target storage device continuously is developed, and vibration characteristics are grasped from a previous model and are sufficiently represented by the finite element analysis. Next, an optimization problem to maximize vibration control performance is defined in a control system designed for the model having the lowered dimension, and arrangement of the actuators is optimized by using genetic algorithm (GA). A detailed description of the GA method is provided in the literature "Special topic: Genetic Algorithm" in "Journal of the Society of Instrument and Control Engineers" Vol. 32, No. 1, January 1993. At this point, a range where the actuators 4a to 4c can be arranged is limited in accordance with strain energy distribution calculated based on the finite element analysis, and search for an optimal position is made within this range. Finally a control system is configured based on a design method of an H infinity control system for the optimized system, and an effect of vibration suppression and robustness are evaluated by performing simulation.

Thus, according to the present invention, arrangement of the actuator that is to be a determination factor of performance of the active vibration control device 1 is calculated based on the optimization method by limiting to the range where the strain energy changes rapidly. By this, calculation time can be significantly shortened because the calculating range is small even in the case of having a complex structure like the storage device 2 or even in the case of having a different large structure. Further, since right and wrong of arrangement of the vibration generation units can be evaluated quantitatively by the optimization calculation, entire performance of the target product can be well balanced by considering trade-off with other design conditions even when arrangement is not the best condition at the time of designing. According to a method of simply arranging an actuator in a portion where strain energy is simply large or in a portion where strain energy change is large, it is not preferable to change an actuator size so as to cover an entire portion actually having a certain size of area in the viewpoints of cost, design, and a manufacturing time. Even in the case of using the plurality of actuators 4 having the predetermined size like the present embodiment, performance is influenced by the setting position and direction of the actuators within the above-described range. Therefore, various kinds of cases are to be tested in order to confirm whether best performance is achieved, thereby largely increasing man-hours.

According to the present embodiment, time required for design becomes shorter, compared to the active vibration control device in the related arts, and a simple design can be achieved. Further, it is apparent from referring to the present embodiment that the active vibration control device can be widely applied to various kinds of apparatuses although it has been difficult introduce the active vibration control device in the viewpoints of design cost and man-hours despite having high vibration control performance compared to a passive vibration control element (such as seismic isolation rubber) and the vibration control device which are widely used for vibration problems.

Second Embodiment

Figure 4:
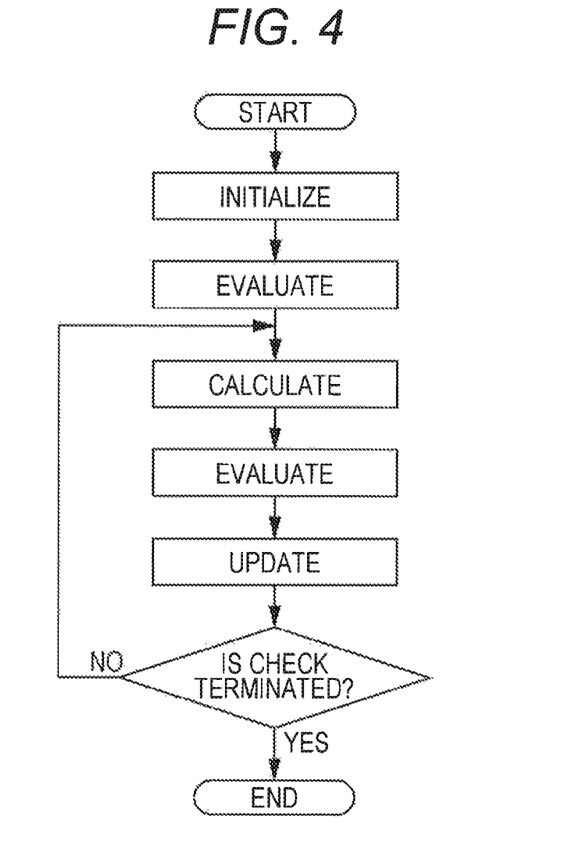
FIG. 4 is a flowchart illustrating an optimization method according to a second embodiment.

A design procedure for an active vibration control device 1 according to a second embodiment will be described. The general design procedure is same as a flowchart illustrated in FIG. 3. According to the present embodiment, a different optimization method is used to optimize arrangement of an actuator. The same point is that arrangement of the actuator is optimized by using a model created by a fine element method for a storage device 2 that is a target. For optimization, a particle swarm optimization (PSO) method is used. According to the PSO method, a plurality of initial parameters is created and an evaluation value is acquired for each of the parameters. Optimization is performed by gradually approximating the parameters to a parameter having a maximum evaluation. At this point, broad search is made by introducing a random number element at the time of updating the parameters. FIG. 4 illustrates a flowchart of the PSO method. According to the present embodiment, a weighting matrix of a control amount is adopted for the design parameters at the time of actuator arrangement and controller design, and optimization is performed integrally. Mainly following two steps of design work are performed.

(1) Control System Design

A control system used for simulation is formed for optimizing arrangement of the actuator. First, a state equation is created from a fine element model. However, only a part of modes is adopted in order to reduce a calculation load, and then dimension of the model is lowered for examination. For example, the method is to limit the mode to main natural modes existing within a range from a frequency lower than a frequency of the target to a high frequency, for example.

Figure 5A:
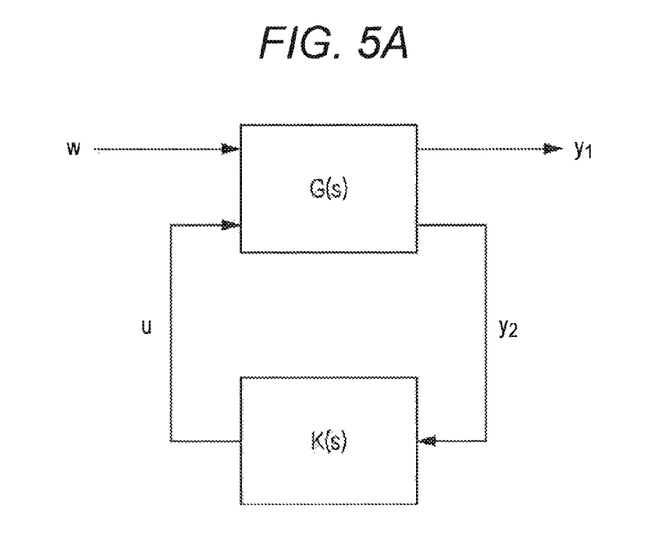
FIG. 5A is a block diagram illustrating a control system configuration according to the second embodiment.
Figure 5B:
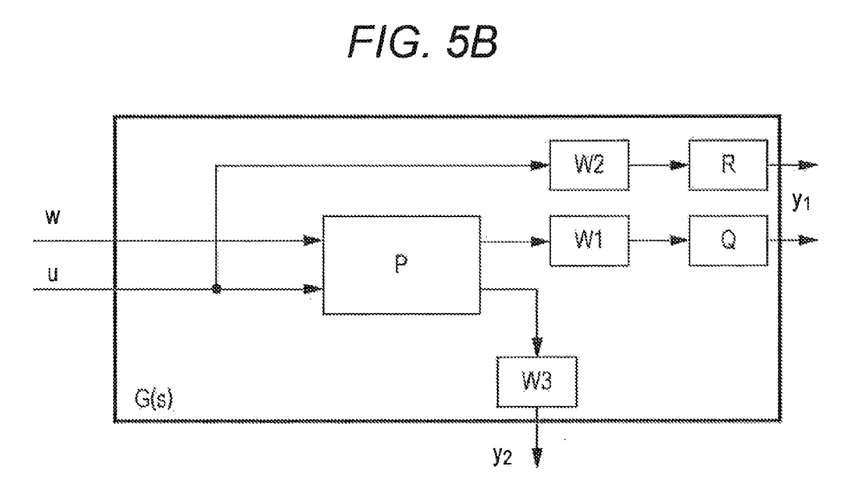
FIG. 5B is a block diagram illustrating the control system configuration according to the second embodiment.

In this study, the controller is designed by using an H infinity control theory to form the control system. FIG. 5A is a block diagram illustrating the present control system, and FIG. 5B illustrates details of a generalization control target G(s). Here, note that $y_1$, $y_2$, w, and u respectively represent a control amount, observation output, disturbance, and control input. For the observation output $y_2$, output of an acceleration sensor is used. Further, the control amount $y_1$ is defined by a formula below.

$$y_1 = \left\{ \begin{array}{c} Q^{1/2} z_1 \\ R^{1/2} u \end{array} \right\} \quad \text{[Mathematical Formula 1]}$$

Here, note that $z_1$ represents evaluation response, and a physical amount same as the observation output is used. Q and R represent weighting matrices for the evaluation response and the control input respectively, and control performance and control energy are adjusted by optionally adjusting these weighting matrices. W1 to W3 are frequency weights for the evaluation response, control input, and observation output respectively, and in this case, all of them are adapted to define static gains.

The controller is designed in accordance with the H infinity control theory for the above-described system. In this study, an H infinity control problem is defined as follows.

$$\min \|T_{y_1 w}\|_\infty \quad \text{[Mathematical Formula 2]}$$

Here, note that $T_{y_1 w}$ represents a transfer function from the disturbance w to the control amount $y_1$. The control system is formed by using the above-described system, and optimization is performed by evaluating control performance in each arrangement position of the actuator.

(2) Optimization Calculation

Figure 6:
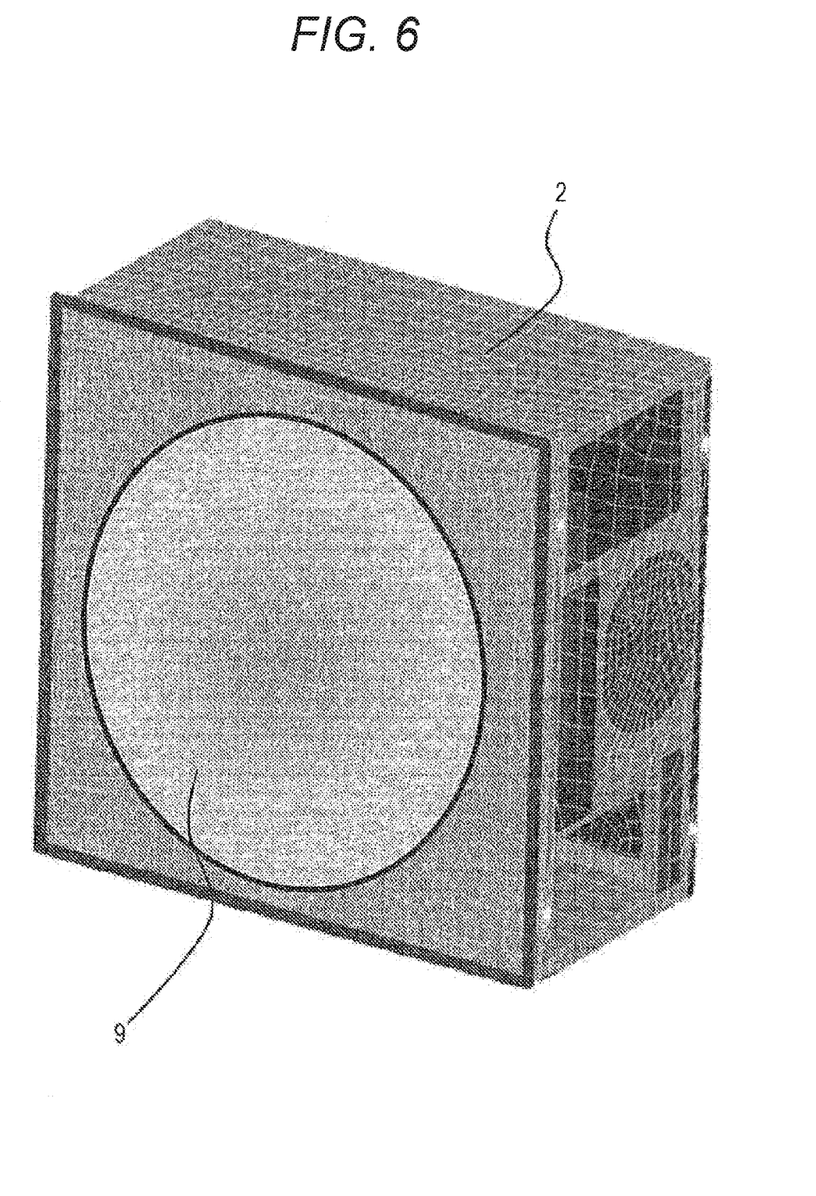
FIG. 6 is a schematic diagram illustrating an analysis range according to the present invention.

According to the present embodiment, weighting matrices of the control amount Q, R are adopted as design variables in addition to a coordinate and a direction (extending direction in the case of a piezoelectric actuator) of the actuator, and optimization is performed integrally including a control device. However, arrangement of the actuator is limited to an optimization calculation range 9 illustrated in FIG. 6. The range is selected by selecting a portion where strain energy changes rapidly from strain energy distribution acquired based on finite element analysis. At this point, an H infinity norm of the evaluation response is adopted as an evaluation function for optimization to minimize the evaluation function. While arrangement of the actuator that provides high control performance is found by varying the respective design variables and making a search for a solution having a minimum H infinity norm from the disturbance to the evaluation response, the weighting matrix of the control amount is simultaneously optimized.

In the case of making a search for arrangement by using the particle swarm optimization method (PSO method) like the present embodiment, calculation time becomes shorter compared to the case of using a GA method. Therefore, arrangement of a vibration generation unit can be determined in a shorter time.

Figure 7:
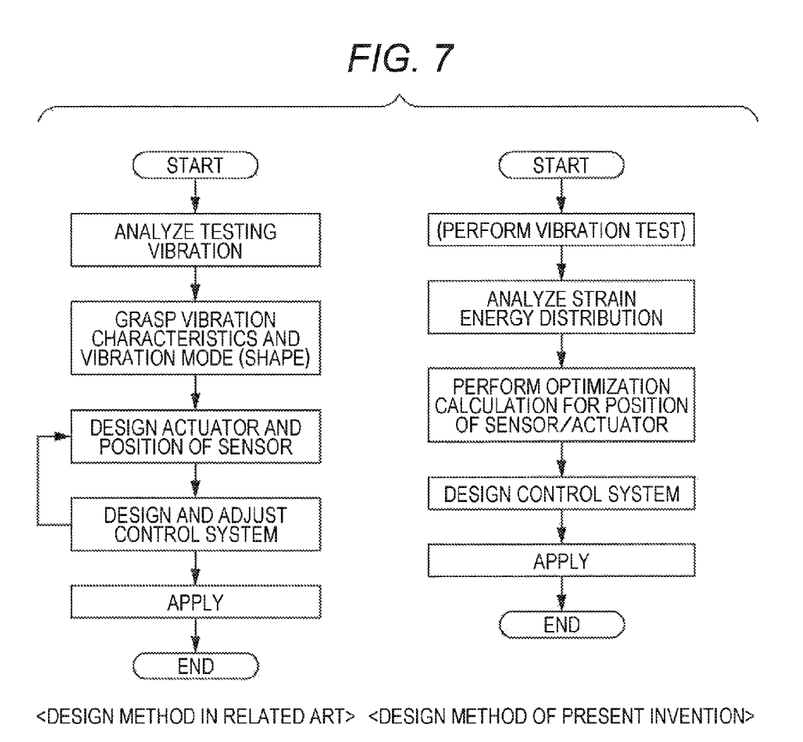
FIG. 7 is a diagram comparing the present invention with a method in the related art.

FIG. 7 illustrates a design method for an active vibration control device in the related art and the design method according to the present embodiment in the case where a vibration problem is caused in a target object. As is understood from FIG. 7, in the case of designing the active vibration control device in the related arts, processing flows as follows: grasping vibration characteristics of a target object; modeling; selecting or designing a sensor and an actuator; examining setting position thereof; and designing a control system. It takes a certain time including the case of returning to a previous step in accordance with the situation, but according to the present embodiment, design can be quickly performed because the sensor and the actuator are standardized. This can remarkably reduce man-hour and cost required for designing.

Meanwhile, the present invention is not limited to the first and second embodiments described above, and various kinds of modification may be included. For example, the first and second embodiments are described in detail to explain the present invention in an understandable manner, and are not necessarily limited to the one including all of the configurations described above. Additionally, a configuration of one embodiment can be partly replaced with a configuration of another embodiment, and a configuration of another embodiment can also be added to a configuration of an embodiment. Further, addition, deletion, and substitution of other components can be made to a part of the configurations of the respective embodiments.

What is claimed is:

1. A vibration control device mounted on a structure body of a target where vibration is to be damped, comprising:
   a vibration detection unit configured to detect vibration of a portion of the target via at least one sensor mounted on the structure body of the target;
   a vibration generation unit configured to generate strain in a portion of the target via at least one actuator mounted on the structure body of the target; and
   a control unit configured to generate a control signal to determine drive force of the vibration generation unit based on a signal from the vibration detection unit, wherein
   strain energy distribution of the target is measured or calculated, and
   setting positions of both the at least one sensor of the vibration detection unit and the at least one actuator of the vibration generation unit are determined based on an optimization method while limiting a calculating range to a range in which strain energy changes rapidly.

2. The vibration control device according to claim 1, wherein the vibration detection unit is configured to detect strain at a portion of the target.

3. The vibration control device according to claim 1, wherein the setting positions of both the at least one sensor of the vibration detection unit and the at least one actuator of the vibration generation unit are determined by using a particle swarm optimization method (PSO method) within the limited range in which strain energy changes rapidly.

4. The vibration control device according to claim 1, wherein the setting positions of both the at least one sensor of the vibration detection unit and the at least one actuator of the vibration generation unit are determined by using genetic algorithm (GA) within a the limited range in which strain energy changes rapidly.

5. A design method for a vibration control device mounted on a structure body of a target where vibration is to be damped,
   the vibration control device including:
   a vibration detection unit configured to detect vibration of a portion of the target via at least one sensor mounted on the structure body of the target;
   a vibration generation unit configured to generate strain in a portion of the target via at least one actuator mounted on the structure body of the target; and
   a control unit configured to generate a control signal to determine drive force of the vibration generation unit based on a signal from the vibration detection unit,
   the design method comprising:
   measuring or calculating strain energy distribution of the target; and
   determining setting positions of both the at least one sensor of the vibration detection unit and the at least one actuator of the vibration generation unit based on an optimization method while limiting a calculating range to a range in which strain energy changes rapidly.

* * * * *